(12) United States Patent
Jenkins et al.

(10) Patent No.: US 10,491,610 B2
(45) Date of Patent: Nov. 26, 2019

(54) REMOTE MONITORING OF SOFTWARE

(71) Applicant: International Business Machines Corporation, Armonk, NY (US)

(72) Inventors: Keith A. Jenkins, Sleepy Hollow, NY (US); Raphael P. Robertazzi, Ossining, NY (US); Alberto Valdes Garcia, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 187 days.

(21) Appl. No.: 15/159,872

(22) Filed: May 20, 2016

(65) Prior Publication Data

US 2017/0339167 A1    Nov. 23, 2017

(51) Int. Cl.
*H04L 29/06*    (2006.01)
*G06F 1/3206*   (2019.01)

(52) U.S. Cl.
CPC ........ *H04L 63/1416* (2013.01); *G06F 1/3206* (2013.01)

(58) Field of Classification Search
CPC ............................. H04L 63/1416; G06F 1/3206
See application file for complete search history.

(56) References Cited

U.S. PATENT DOCUMENTS

| | | | |
|---|---|---|---|
| 7,877,621 B2 | 1/2011 | Jacoby et al. | |
| 9,268,938 B1 * | 2/2016 | Aguayo Gonzalez | ........................ G01R 21/00 |
| 2006/0241880 A1 | 10/2006 | Forth et al. | |
| 2007/0037610 A1 * | 2/2007 | Logan | ............... H04M 1/72563  455/574 |
| 2015/0101047 A1 | 4/2015 | Sridhara et al. | |

OTHER PUBLICATIONS

Le-Huy et al. (Low-Power Wake-Up Radio for Wireless Sensor Networks, Mobile Networks and Applications Apr. 2010, vol. 15, Issue 2, pp. 226-236) (Year: 2010).*
Guri et al. (GSMem: Data Exfiltration from Air-Gapped Computers over GSM Frequencies, Aug. 12-14, 2015, USENIX, pp. 849-864) (Year: 2015).*
Microsemi (ZL70250 Ultra-Low-Power Sub-GHz RF Transceiver, 2013, 29 pages) (Year: 2013).*

(Continued)

*Primary Examiner* — Oleg Korsak
(74) *Attorney, Agent, or Firm* — David B. Woycechowsky

(57) ABSTRACT

A software signature transceiver includes a signature receiver configured to couple to a programmable electronic device and sense a signature signal generated by the programmable electronic device, wherein the signature signal varies according to computer program codes executed by the programmable electronic device, and a signature transmitter operably connected to the signature receiver, the signature transmitter configured to transmit a signature transmission signal corresponding to the signature signal. A corresponding method to use the software signature transceiver and a software monitoring device to determine whether unknown software is executing on a programmable electronic device is also disclosed herein. A corresponding system comprising the programmable electronic device, the software signature transceiver, and a software monitoring device is also disclosed herein.

18 Claims, 4 Drawing Sheets

(56) References Cited

OTHER PUBLICATIONS

Disclosed Anonymously et al., "A method to detect and block browser-"overlay" malware", An IP.com Prior Art Database Technical Disclosure, IP.com No. IPCOM000242012D, IP.com Electronic Publication Date: Jun. 14, 2015, 2 pages.

IBM et al., "Black-Box Automated Detection of Malicious Content in Web Applications", An IP.com Prior Art Database Technical Disclosure, Original Publication Date: Jan. 28, 2010, IP.com No. IPCOM000192678D, IP.com Electronic Publication Date: Jan. 28, 2010, 3 pages.

\* cited by examiner

REMOTE MONITORING OF SOFTWARE

BACKGROUND OF THE INVENTION

The present invention relates generally to programmable electronic devices and more particularly to software security in programmable electronic devices.

An increasing number of devices operate under electronic control and have become programmable. Examples include appliances, thermostats, vehicles, and phones including mobile phones. The trend is expected to continue as even smaller devices, such as internet-of-things sensor devices, become programmable and interconnected.

One issue related to programmable electronic devices, particularly networked programmable electronic devices, is security. While the ability to update networked programmable devices with new software provides substantial advantages, such as improved functionality, reduced maintenance costs and extended product lifetimes, networked programmable devices are vulnerable to malicious software.

SUMMARY

A software signature transceiver includes a signature receiver configured to couple to a programmable electronic device and sense a signature signal generated by the programmable electronic device, wherein the signature signal varies according to computer program codes executed by the programmable electronic device, and a signature transmitter operably connected to the signature receiver, the signature transmitter configured to transmit a signature transmission signal corresponding to the signature signal. A corresponding method to use the software signature transceiver and a software monitoring device to determine whether unknown software is executing on a programmable electronic device is also disclosed herein. A corresponding system comprising the programmable electronic device, the software signature transceiver, and a software monitoring device is also disclosed herein.

DETAILED DESCRIPTION

The embodiments disclosed herein recognize that many programmable electronic devices have restricted memory and processing resources and are unable to execute anti-virus and/or anti-malware software. The embodiments disclosed herein also recognize that anti-virus and anti-malware software has limitations and that trade-offs exist between the capabilities of such software and the complexity of the host system. The embodiments disclosed herein also recognize that various signals generated by programmable electronic devices vary according to the software that is executed thereon. Furthermore, monitoring such signals facilitates pattern matching to determine if the software executing on a particular programmable electronic device matches an expected pattern. The embodiments disclosed herein also recognize that direct local measurement of software dependent signals is often impractical and cost prohibitive. However, the ability to remotely monitor such signals represents an improvement in the art of software security.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of the invention as set forth hereinafter.

Figure 1:
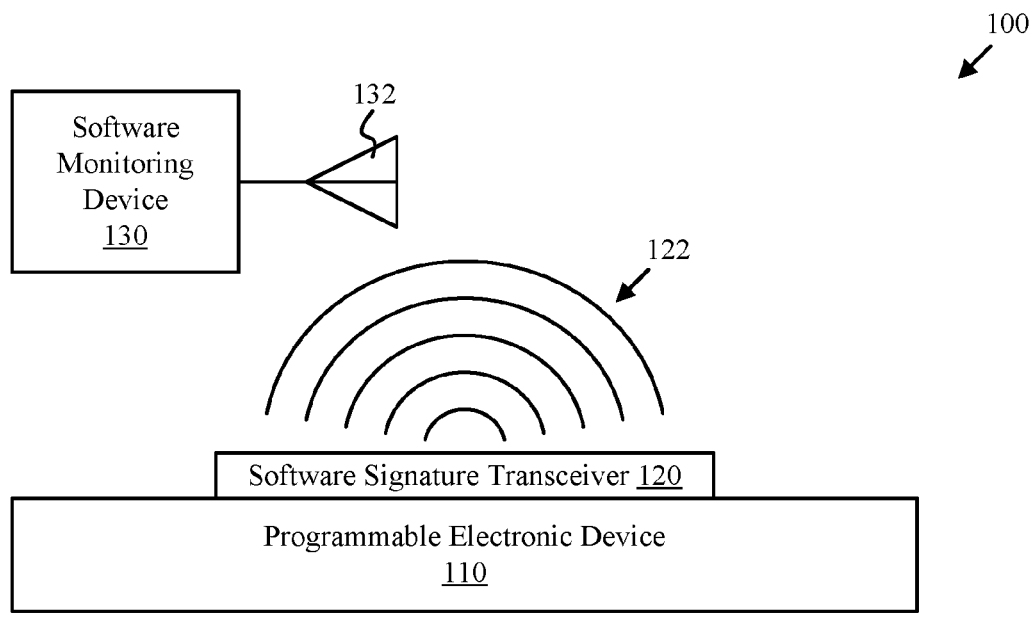
FIG. 1 is a schematic block diagram depicting one example of a software monitoring system in accordance with at least one embodiment of the present invention.

FIG. 1 is a schematic block diagram depicting one example of a software monitoring system 100 in accordance with at least one embodiment of the present invention. As depicted, the software monitoring system 100 includes a programmable electronic device 110, a software signature transceiver 120, and a software monitoring device 130. The software monitoring system 100 enables remote monitoring of software executing on the programmable electronic device 110.

The programmable electronic device 110 is a programmable device that executes software and intrinsically or explicitly generates one or more signature signals (not shown) that vary according to the software that is executed thereon. For example, various signals generated by the programmable electronic device such as instruction bearing signals and/or power supply signals may vary according to the software executed thereon. The programmable electronic device 110 may radiate electromagnetic emissions corresponding to the generated signals.

The depicted software signature transceiver 120 is coupled to the programmable electronic device 110 and senses a signature signal that varies according to the software that is executed on the programmable electronic device 110. For example, the signature signal may vary according to the power consumption levels associated with each software instruction or the type of instruction that is executed. The software signature transceiver 120 senses the signature signal and transmits a signature transmission signal 122 corresponding to (including substantially identical to) the signature signal.

The software signature transceiver 120 may be coupled to the programmable electronic device 110 in a manner that maximizes the ability to sense the signature signal. For example, the position and orientation of the software signature transceiver 120 relative to the programmable electronic device 110 may be selected to maximize coupling of the signature signal to the software signature transceiver 120. Notwithstanding the foregoing, the software signature transceiver 120 may be autonomous from the programmable electronic device 110 such that software signature transceiver 120 cannot be controlled or deactivated via computer program codes executed on the programmable electronic device 110.

In the depicted embodiment, the software signature transceiver 120 is physically and electromagnetically coupled to the programmable electronic device 110 and the signature transmission signal 122 is a radio wave that is generated by amplifying and modulating the signature signal onto a carrier wave. In addition to conveyance via radio waves the signature transmission signal 122 may be conveyed from the software signature transceiver 120 through other means such as optical means, sonic means, digital network means, and the like.

The depicted software monitoring device 130 receives the signature transmission signal 122 via an antenna 132 and determines whether the signature transmission signal 122 corresponds to software that is expected to be executing on the programmable electronic device. In some embodiments, if the signature transmission signal 122 does not correspond to expected software, the software monitoring device 130 activates an alarm. In certain embodiments, the software signature transceiver 120 is able to determine whether a monitoring device (e.g., 130) is proximate and available to receive transmissions. In those embodiments, the software signature transceiver may suppress transmissions until a monitoring device is present and available. Suppressing transmissions until a monitoring device is present and available reduces power consumption and the ability of a malicious party to detect and disable the signature transmission signal 122.

In some embodiments, the software signature transceiver 120 communicates/coordinates with the software monitoring device 130 about when to transmit (e.g., intermittently or on-demand) and what information to transmit. For example, in certain embodiments the software signature transceiver 120 is able to sense a variety of signals that vary according to the executed software and transmit one or more selected signals at times selected by the software monitoring device 130.

In certain embodiments, the software monitoring device 130 monitors signature transmission signals 122 transmitted by multiple software signature transceivers 120 that are each coupled to a different programmable electronic device 110. The signature transmission signals 122 may be continuously or intermittently transmitted. The signature transmission signals 122 may be time multiplexed onto a single communication channel or transmitted on separate communication channels. The communication channel(s) may be dedicated to software monitoring and have a modulation or encoding scheme that is not supported by commercially available communications equipment and does not interfere with commercially available communications equipment. In some embodiments, the software signature transceiver 120 uses a device-dependent modulation or encoding scheme which requires the software monitoring device 130 to have knowledge of a globally unique identifier for the programmable electronic device 110 in order to monitor the signature transmission signal 122 transmitted by the particular programmable electronic device 110.

Figure 2:
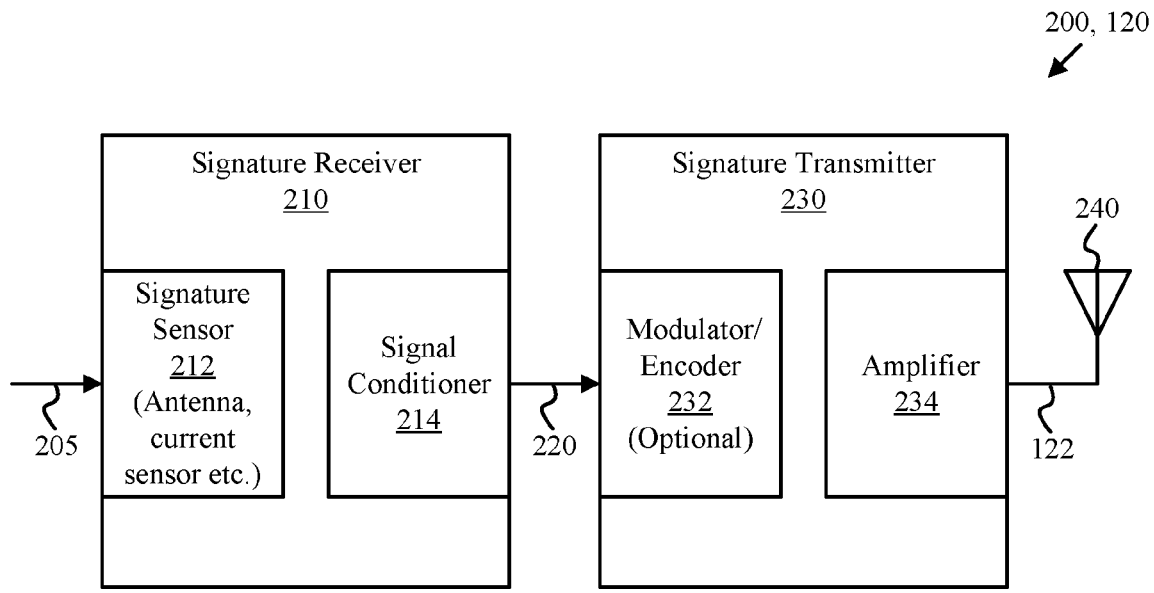
FIG. 2 is a schematic block diagram depicting one example of a software signature transceiver in accordance with at least one embodiment of the present invention.

FIG. 2 is a schematic block diagram depicting one example of a software signature transceiver 200 in accordance with at least one embodiment of the present invention. As depicted, the software signature transceiver 200 includes a signature receiver 210, a signature transmitter 230, and a transmitting antenna 240. The software signature transceiver 200 is one example of the software signature transceiver 120 depicted in FIG. 1.

The depicted signature receiver 210 includes a signature sensor 212 that enables the signature receiver 210 to sense a signature signal 205 generated by the programmable electronic device 110 and provide a sensed signature signal 220. The signature sensor 212 may be an electromagnetic sensor (e.g., an antenna), a current sensor, a voltage sensor or the like. The signature receiver 210 may also include a signal conditioner 214 that performs various signal conditioning functions such as filtering, amplification, and digitizing of the signature signal 205.

In some embodiments, the signature sensor 212 is electronically connected to the signature signal 205. For example, the signature sensor 212 may be integrated into, or attach to, a power supply circuit of the programmable electronic device 110 and sense power consumption fluctuations of the programmable electronic device 110. The power fluctuations may correspond to the device as a whole or a portion of the device such as a processor.

In other embodiments, the signature sensor 212 is electromagnetically coupled to the signature signal 205. For example, the signature signal 205 may be electromagnetic emissions from the programmable electronic device 110, and the signature sensor 212 may comprise a receiving antenna or some other electromagnetic element that senses fluctuations in electromagnetic emissions.

The signature transmitter 230 may receive the sensed signature signal 220 and transmit the signature transmission signal 122. The signature transmitter 230 may be a wireless transmitter that transmits the signature transmission signal 122 via the transmitting antenna 240. The transmitting antenna 240 may be omni-directional (e.g., for mobile applications) or directional (e.g., for stationary applications). In some embodiments, the transmitting antenna 240 is also able to receive a control signal (not shown) from the software monitoring device 130 (see FIG. 1) and the signature transmitter 230 is configured to receive and respond to the control signal. In those embodiments, the software signature transceiver 200 may operate under control of the monitoring device 130 (e.g., as described for the transceiver 120 in the description of FIG. 1).

In some embodiments, the signature transmission signal 122 is generated by the modulator/encoder 232 by encoding the sensed signature signal and/or modulating a carrier signal with the sensed signature signal and amplified by an amplifier 234 to facilitate effective transmission. In some embodiments, the modulator/encoder 232 modulates a carrier frequency with the sensed signature signal 220 and the modulated signal is amplified by the amplifier 234 to provide the signature transmission signal 122.

Figure 3:
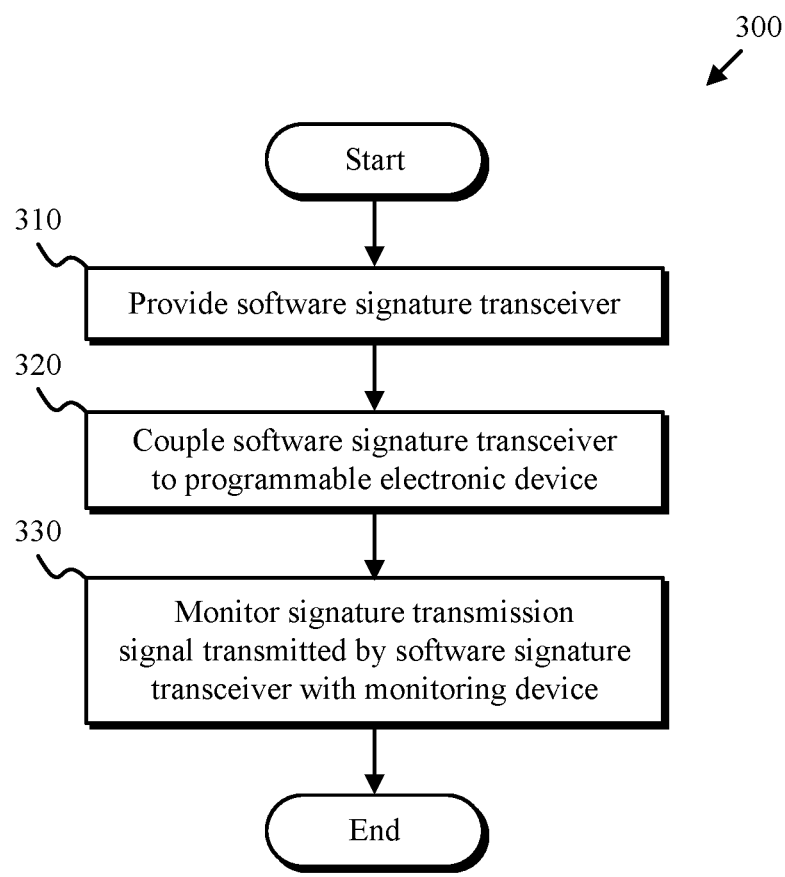
FIG. 3 is a flowchart depicting one example of a software monitoring method in accordance with at least one embodiment of the present invention.

FIG. 3 is a flowchart depicting one example of a software monitoring method 300 in accordance with at least one embodiment of the present invention. As depicted, the software monitoring method 300 includes providing (310) a software signature transceiver, coupling (320) the software signature transceiver to a programmable electronic device, and monitoring (330) a signature transmission signal transmitted by the software signature transceiver. The software monitoring method 300 may be partially or wholly conducted by a technician or a user to ensure the integrity of software executing on the programmable electronic device.

Figure 4:
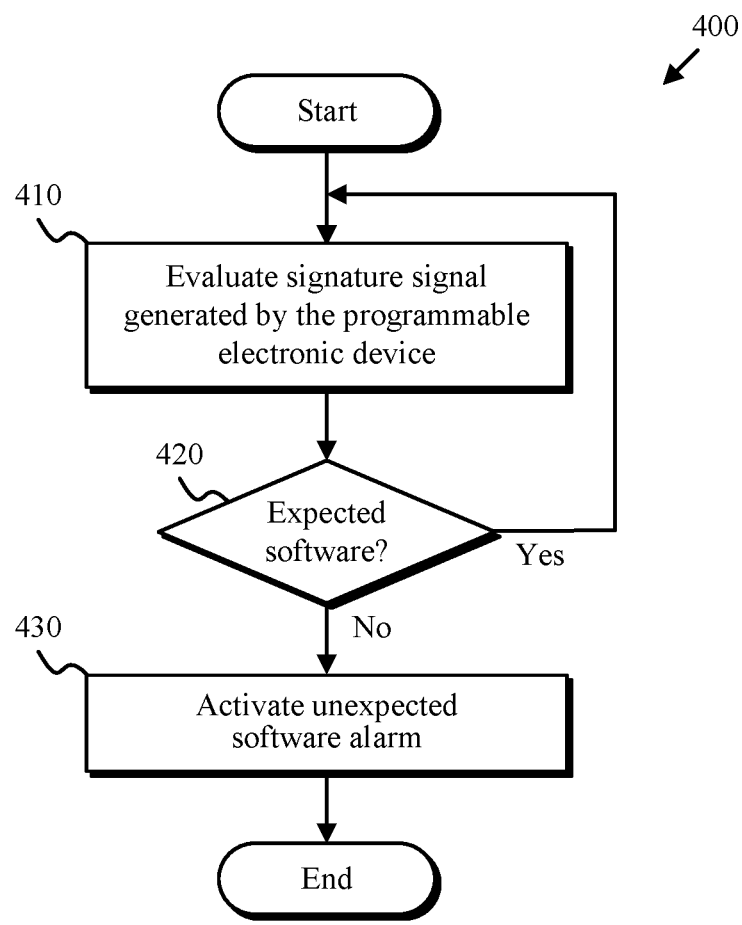
FIG. 4 is a flowchart depicting one example of an unexpected-software detection method in accordance with at least one embodiment of the present invention.

FIG. 4 is a flowchart depicting one example of an unexpected software detection method 400 in accordance with at least one embodiment of the present invention. As depicted, the unexpected software detection method 400 includes evaluating (410) a signature signal, determining (420) whether the signature signal corresponds to expected software, and activating (430) an unexpected software alarm. The unexpected software detection method 400 may be conducted by the software monitoring device 130 or the like.

Evaluating (410) a signature signal may include comparing a received signature signal that is software dependent with one or more known signature signal patterns. In some embodiments, the received signature signal is processed or conditioned to facilitate pattern matching. For example, noise filtering and a fast fourier transform process may be conducted on the received signature signal to determine spectral content information for the signature signal and facilitate pattern matching. Alternately, another form of correlation with known signal patterns may be conducted.

Determining (420) whether the signature signal corresponds to expected software may include conducting a pattern matching process and analyzing the pattern matching results. If the signature signal corresponds to expected software, the method loops to the evaluating operation 410. If the signature signal does not correspond to expected software, the method continues by activating (430) an unexpected software alarm. In one embodiment, activating (430) an unexpected software alarm includes sending a message to a user or system administrator.

The embodiments disclosed herein enable the detection of unwanted software on programmable electronic devices that have restricted memory and processing resources. One of skill in the art will appreciate that many variations of the disclosed embodiments, as well as other embodiments, may be implemented that fit within the scope of the claimed invention.

Figure 5:
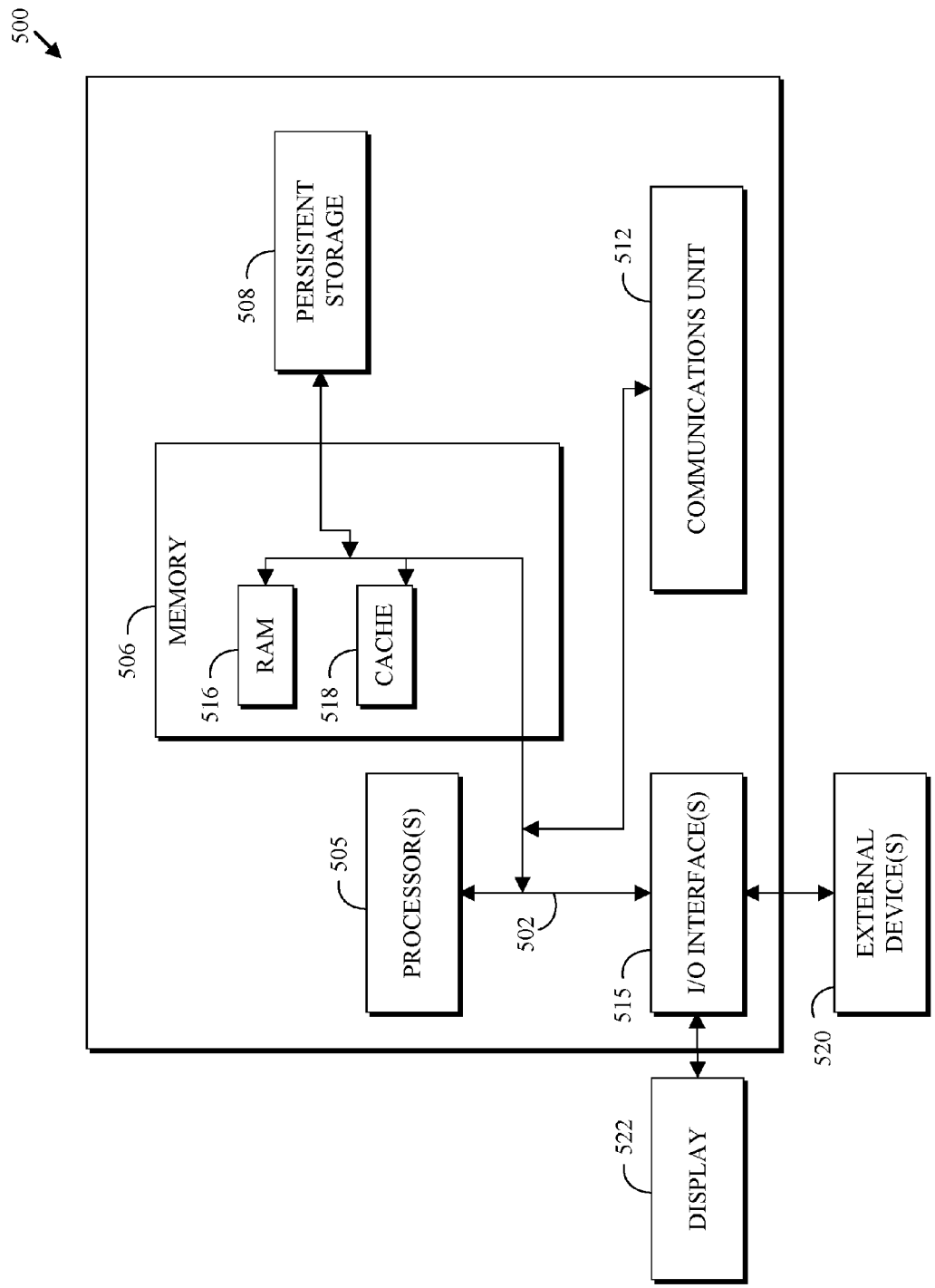
FIG. 5 is a block diagram depicting one example of a computing apparatus suitable for executing one or more of the methods disclosed herein.

FIG. 5 is a block diagram depicting one example of a computing apparatus (i.e., computer 500) suitable for executing one or more of the methods disclosed herein. It should be appreciated that FIG. 5 provides only an illustration of one embodiment and does not imply any limitations with regard to the environments in which different embodiments may be implemented. Many modifications to the depicted environment may be made.

As depicted, the computer 500 includes communications fabric 502, which provides communications between computer processor(s) 505, memory 506, persistent storage 508, communications unit 512, and input/output (I/O) interface(s) 515. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In the depicted embodiment, memory 506 includes random access memory (RAM) 516 and cache memory 518. In general, memory 506 can include any suitable volatile or non-volatile computer readable storage media.

One or more programs may be stored in persistent storage 508 for execution by one or more of the respective computer processors 505 via one or more memories of memory 506.

The persistent storage 508 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 512, in these examples, provides for communications with other data processing systems or devices. In these examples, communications unit 512 includes one or more network interface cards. Communications unit 512 may provide communications through the use of either or both physical and wireless communications links.

I/O interface(s) 515 allows for input and output of data with other devices that may be connected to computer 500. For example, I/O interface 515 may provide a connection to external devices 520 such as a keyboard, keypad, a touch screen, and/or some other suitable input device. External devices 520 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 508 via I/O interface(s) 515. I/O interface(s) 515 may also connect to a display 522. Display 522 provides a mechanism to display data to a user and may be, for example, a computer monitor.

One of skill in the art will appreciate that the above disclosed embodiments may be adapted for a variety of environments and applications. Furthermore, the programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The embodiments disclosed herein include a system, a method, and/or a computer program product. The computer program product may include a computer readable storage medium (or media) having computer readable program instructions thereon for causing a processor to carry out the methods disclosed herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that this description is not intended to limit the invention. On the contrary, the embodiments presented are intended to cover some of the alternatives, modifications, and equivalents, which are included in the spirit and scope of the invention as defined by the appended claims. Further, in the detailed description of the disclosed embodiments, numerous specific details are set forth in order to provide a comprehensive understanding of the claimed invention. However, one skilled in the art would understand that various embodiments may be practiced without such specific details.

Although the features and elements of the embodiments disclosed herein are described in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:
1. An apparatus comprising:
a signature transceiver configured to:

couple to a programmable electronic device and sense a signature signal generated by the programmable electronic device, wherein the signature signal varies according to computer program codes executed by the programmable electronic device, generate a signature transmission signal, based on the signature signal, with the signature transmission corresponding to a radio wave created by amplifying and modulating the signature signal onto a carrier wave, and transmit the radio wave;

wherein the signature transceiver senses a variety of signals that vary according to software being executed by the programmable electronic device; and wherein the signature transceiver is configured to determine whether a monitoring device is available to receive transmissions and suppress the creation of the radio wave by amplifying and modulating the signature signal onto the carrier wave.

2. The apparatus of claim 1, wherein the signature transceiver is configured to electromagnetically or electronically sense the signature signal.

3. The apparatus of claim 1, wherein the signature signal corresponds to a power consumption level for the programmable electronic device.

4. The apparatus of claim 1, wherein the signature transceiver comprises a power consumption sensor.

5. The apparatus of claim 4, wherein the power consumption sensor comprises a current or voltage sensor.

6. The apparatus of claim 1, wherein the signature signal comprises electromagnetic emissions from the programmable electronic device.

7. The apparatus of claim 1, wherein the signature transceiver comprises a receiving antenna for receiving the signature signal.

8. The apparatus of claim 1, wherein the signature transceiver includes a wireless transmitter.

9. The apparatus of claim 1, wherein the signature transceiver is coupled to a transmitting antenna.

10. The apparatus of claim 1, wherein the signature transmission signal is generated by encoding the signature signal or modulating a carrier signal with the signature signal.

11. The apparatus of claim 1, wherein the signature transceiver transmits on a communication channel dedicated to monitoring one or more signature transmission signals corresponding to signature signals.

12. The apparatus of claim 1, wherein the signature transceiver transmits a device-dependent transmission signal.

13. The apparatus of claim 1, wherein the signature transceiver cannot be deactivated via the computer program codes.

14. The apparatus of claim 1, wherein the signature transceiver is configured, or configurable, to intermittently transmit the signature transmission signal.

15. An apparatus comprising:
a signature transceiver configured to couple to a programmable electronic device and sense a signature signal generated by the programmable electronic device, wherein the signature signal varies according to computer program codes executed by the programmable electronic device; and
a monitor determination device configured to determine when a monitoring device is proximate and available to receive transmissions;
wherein the signature transceiver is further configured to: (i) suppress transmission of a signature transmission signal when a monitoring device is not proximate, and (ii) transmit a signature transmission signal corresponding to the signature signal when a monitoring device is proximate;
wherein the signature transceiver senses a variety of signals that vary according to software being executed by the programmable electronic device; and
wherein the signature transceiver transmits one or more selected signals at times selected by the monitoring device.

16. The apparatus of claim 15 wherein the signature transceiver is configured to electromagnetically or electronically sense the signature signal.

17. An apparatus comprising:
a signature transceiver configured to couple to a programmable electronic device and sense signature signal generated by the programmable electronic device, wherein the signature signal varies according to computer program codes executed by the programmable electronic device;
a monitor determination device configured to determine when a monitoring device is proximate and available to receive transmissions; and
a signal generator configured to generate a signature transmission signal, based on the signature signal, with the signature transmission corresponding to a radio wave created by amplifying and modulating the signature signal onto a carrier wave;
wherein the signature transceiver is further configured to: (i) suppress transmission of the signature transmission signal as a radio wave when a monitoring device is not proximate, and (ii) transmit the signature transmission signal as a radio wave when a monitoring device is proximate;
wherein the signature transceiver senses a variety of signals that vary according to software being executed by the programmable electronic device; and
wherein the signature transceiver transmits one or more selected signals at times selected by the monitoring device.

18. The apparatus of claim 17 wherein the signature transceiver is configured to electromagnetically or electronically sense the signature signal.

* * * * *